United States Patent
Scholten et al.

(10) Patent No.: US 12,478,927 B2
(45) Date of Patent: Nov. 25, 2025

(54) NANO-BUBBLE GENERATING APPARATUS AND METHOD

(71) Applicant: Moleaer, Inc., Carson, CA (US)

(72) Inventors: Bruce Scholten, Carson, CA (US); Warren Stuart Russell, Carson, CA (US); Andrea White, Carson, CA (US)

(73) Assignee: Moleaer, Inc., Hawthorne, CA (US)

( * ) Notice: Subject to any disclaimer, the term of this patent is extended or adjusted under 35 U.S.C. 154(b) by 411 days.

(21) Appl. No.: 17/196,656

(22) Filed: Mar. 9, 2021

(65) Prior Publication Data

US 2021/0299617 A1  Sep. 30, 2021

Related U.S. Application Data

(60) Provisional application No. 62/993,871, filed on Mar. 24, 2020.

(51) Int. Cl.
| | |
|---|---|
| *B01F 23/231* | (2022.01) |
| *B01F 23/23* | (2022.01) |
| *B01F 23/232* | (2022.01) |
| *C02F 7/00* | (2006.01) |
| *B01F 23/237* | (2022.01) |
| *B01F 101/00* | (2022.01) |

(52) U.S. Cl.
CPC .. *B01F 23/23125* (2022.01); *B01F 23/23123* (2022.01); *B01F 23/2319* (2022.01); *B01F 23/232* (2022.01); *C02F 7/00* (2013.01); *B01F 23/23761* (2022.01); *B01F 2101/305* (2022.01)

(58) Field of Classification Search
None
See application file for complete search history.

(56) References Cited

U.S. PATENT DOCUMENTS

| | | |
|---|---|---|
| 3,545,731 A | 12/1970 | Donald |
| 6,237,897 B1 | 5/2001 | Marina |
| | (Continued) | |

FOREIGN PATENT DOCUMENTS

| | | |
|---|---|---|
| EP | 2060319 | 5/2009 |
| JP | S62-097633 | 5/1987 |
| | (Continued) | |

OTHER PUBLICATIONS

PCT International Search Report and Written Opinion in International Appln. No. PCT/US2021/021438, dated May 20, 2021, 10 pages.

(Continued)

*Primary Examiner* — Hayden Brewster
(74) *Attorney, Agent, or Firm* — Fish & Richardson P.C.

(57) ABSTRACT

An apparatus for producing nano-bubbles in a moving liquid carrier includes a conduit through which a liquid carrier can flow, a gas diffuser disposed on an inner surface of the conduit, and a funnel comprising: (i) a first open end having a first cross-sectional area that receives a moving liquid carrier; (ii) a second open end opposite the first open end defining a second cross-sectional area smaller than the first cross-sectional area and fluidly coupled to the opening of the conduit; and (iii) a wall extending from the first open end to the second open end. The funnel is configured to create turbulent flow above the turbulent threshold in the absence of external energy that allows the liquid carrier to shear gas from the outer surface of the diffuser, thereby forming nano-bubbles in the liquid carrier.

12 Claims, 5 Drawing Sheets

(56) References Cited

U.S. PATENT DOCUMENTS

| | | |
|---|---|---|
| 2002/0096792 A1 | 7/2002 | Valela et al. |
| 2015/0202579 A1 | 7/2015 | Richardson |
| 2017/0259219 A1 | 9/2017 | Russel et al. |
| 2020/0045997 A1 | 2/2020 | Blevins |

FOREIGN PATENT DOCUMENTS

| | | |
|---|---|---|
| JP | 2007-27803 A | 10/2007 |
| JP | 2007-278003 A | 10/2007 |
| JP | 2008-104942 | 5/2008 |
| JP | 2019-18132 A | 10/2019 |
| WO | WO 2019/232273 | 12/2019 |

OTHER PUBLICATIONS

Extended European Search Report in European Appln No. 16889656.9, dated Oct. 27, 2023, 9 pages.
Office Action in Japanese Appln. No. 2022-558103, mailed on Jan. 7, 2025, 10 pages (with English translation).

NANO-BUBBLE GENERATING APPARATUS AND METHOD

CLAIM OF PRIORITY

This application claims priority to U.S. Provisional Application Ser. No. 62/993,871, filed on Mar. 24, 2020, the entire contents of which are hereby incorporated by reference.

TECHNICAL FIELD

This disclosure relates to generating nano-bubbles in a moving liquid carrier.

BACKGROUND

Various systems, such as pump or blower systems, have been used to supply gases, (for example, air) to a volume of a liquid medium (for example, a body of water) to obtain a desired gas saturation level in the liquid medium. Supplying oxygen in a source of water can improve its water quality and benefit various living organisms that utilize the oxygen present in sources of water.

One disadvantage of pump and blower systems is that supplying the gases requires providing an external source of electrical energy, such as a generator, a battery, capacitors, or the like. Moreover, supplying gases to the liquid is an energy-intensive process and the cost of providing the external energy source can be substantial.

Another disadvantage of pump and blower systems is that providing an energy source to certain bodies of water can be challenging and/or undesirable due to their size, location, and accessibility. Consequently, it may not be possible or highly undesirable to implement a pump or blower system in a given body of water.

SUMMARY

In a first general aspect, there is described an apparatus for producing nano-bubbles in a moving liquid carrier such as a river, stream, creek, brook, brooklet, rivulet, strait, canal, channel, delta, sea arm, rill, raceway, carousel, tributary, pipe, and the like. The apparatus includes a conduit having an opening extending axially from a first end to a second end through which the liquid carrier can flow. The conduit further includes a gas diffuser having an inner surface disposed on an inner surface of the conduit and an outer surface configured to contact the liquid carrier as it flows through the conduit. The gas diffuser includes a plurality of pores configured to receive gas from a gas source and transport the gas to the outer surface of the diffuser. In some embodiments, the apparatus includes multiple diffusers arranged in parallel with each other within the conduit. The diffusers can be mounted on a frame that, in turn, is mounted to one or more walls of the conduit.

The apparatus further includes a funnel. The funnel, in turn, includes a first open end configured to receive the moving liquid carrier, the first open end defining a first cross-sectional area; a second open end opposite the first open end that defines a second cross-sectional area that is smaller than the first cross-sectional area; and a wall extending from the first open end to the second open end. The second open end of the funnel is fluidly coupled to the opening of the conduit through which the liquid carrier flows.

The funnel is configured to generate a flow velocity in the liquid carrier received by the opening that is sufficient to create turbulent flow above the turbulent threshold in the absence of an external energy source that allows the liquid carrier to shear gas from the outer surface of the diffuser, thereby forming nano-bubbles in the liquid carrier. For example, the funnel can be configured to generate flow velocities of at least 2 m/s. Generating a high flow velocity helps prevent the nano-bubbles from coalescing once formed.

Examples of an external energy source includes pumps, blowers, or any component requiring electrical power. While the apparatus can be used with a pump, the pump is not necessary. This has the advantage of allowing the apparatus to be used in a variety of moving sources of water, including sources where it would be difficult, if not impossible, to use a pump or any component requiring electrical power.

In some embodiments, the conduit has a generally rectangular cross-sectional shape, while in other embodiments the conduit is generally tubular. The conduit may include a plurality of gas diffusers disposed on the inner surface of the conduit. The conduit, funnel, and gas diffuser may be configured to remain stationary with respect to one another during operation of the apparatus.

The apparatus may include a second funnel coupled to the second end of the conduit. One or both funnels may include a flange. The wall of one or both funnels may be frusto-conical. In some embodiments, the wall of one or both funnels with respect to the inner surface of the conduit defines an angle of less than 45 degrees. In some embodiments, the angle ranges from 12 to 22 degrees.

The above-described apparatus may be used in a method to generate nano-bubbles in a moving liquid carrier. The method includes exposing the apparatus to a moving liquid carrier such that the liquid carrier flows into the open end of the funnel and through the conduit from the first end of the conduit to the second end of the conduit; and introducing gas from a gas source through the pores of the diffuser to the outer surface of the diffuser. The funnel generates a flow velocity in the liquid carrier sufficient to create turbulent flow above the turbulent threshold in the absence of external energy such that the liquid carrier shears the gas from the outer surface of the diffuser to form nano-bubbles in the liquid carrier.

As used herein, the term "nano-bubble" refers to a bubble that has a diameter of less than one micrometer ($\mu m$). A micro-bubble, which is larger than a nano-bubble, is a bubble that has a diameter greater than or equal to one $\mu m$ and smaller than 50 $\mu m$. A macro-bubble is a bubble that has a diameter greater than or equal to 50 $\mu m$.

The above-described apparatus and method can be used to introduce gas into bodies of water of any size, including relatively large bodies of water, examples of which are listed above. Because the apparatus can operate without the need for an external energy source such as a pump, it can be used to treat large volumes of water not suitable for a pump, thereby expanding the number and types of applications in which the apparatus can be used. Exemplary applications include introducing gases such as oxygen and/or ozone into the aforementioned bodies of water for purposes of elevating dissolved oxygen, biological treatment, aquaculture, remediation, decontamination, algae control, and the like.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1A:
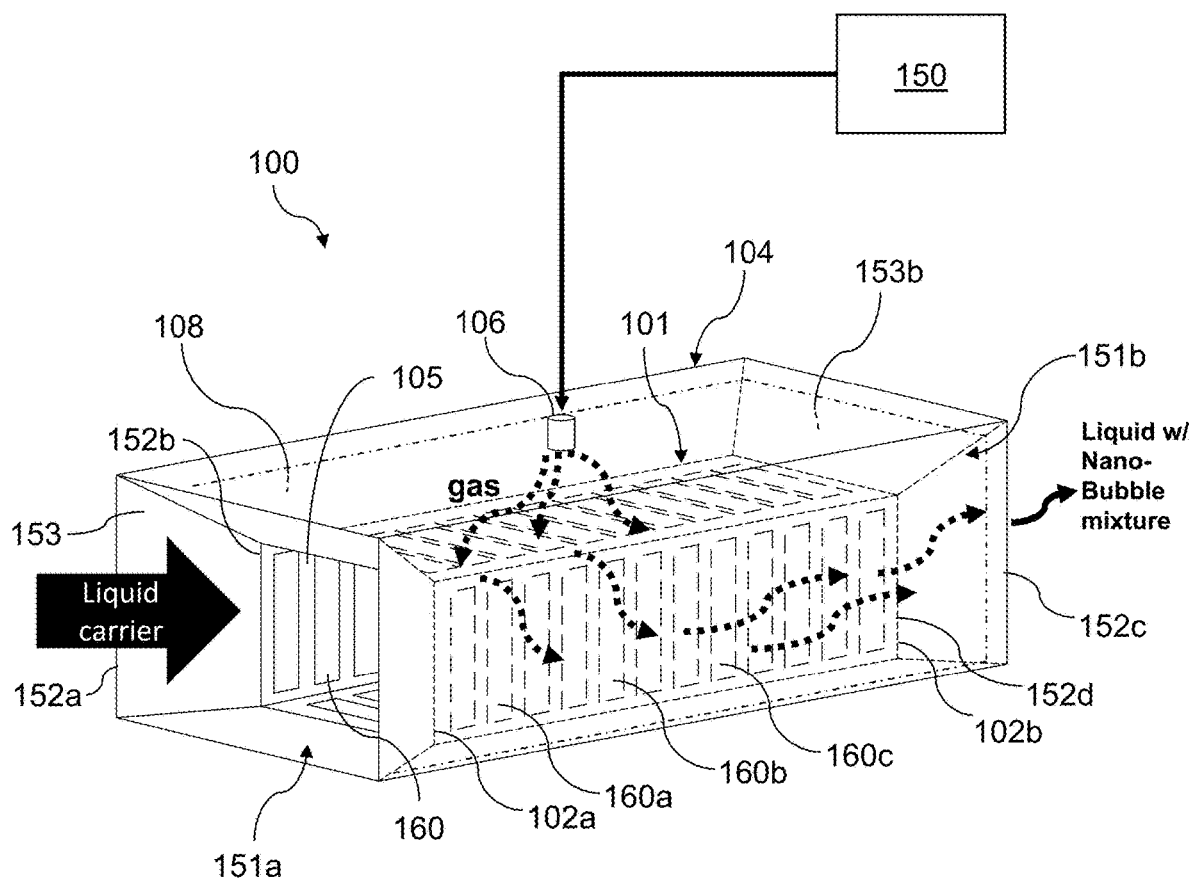
FIG. 1A is a schematic diagram of an exemplary apparatus that can be implemented to infuse gas into liquid.

FIG. 1A is a schematic diagram of an apparatus 100 that can be implemented to infuse gas into a moving liquid carrier. The apparatus 100 includes a conduit 101, a funnel 151a, an optional second funnel 151b, and a gas diffuser 160 within an outer housing 104. The conduit 101 that defines an opening extending axially from a first end 102a to a second end 102b. The funnel 151a includes a first open end 152a, a second open end 152b, and a wall 153 extending from the first open end 152a to the second open end 152b. The gas diffuser 160 is disposed along an inner surface 105 of the conduit 101. The gas diffuser is aligned with or disposed over an opening defined by the conduit such that gas, received from a gas source 150 via gas inlet 106, flows into a sealed hollow cavity 108 of the outer housing 104 and passes through the gas diffuser 160 into conduit 101. The conduit 101, funnel 151a, and gas diffuser 160 are configured to remain stationary with respect to one another during operation of the apparatus 100. In some embodiments, the apparatus 100 includes only one funnel (e.g., funnel 151a at the first end 102a of the conduit) and does not include a second funnel (e.g., funnel 151b), which is optional.

Figure 1B:
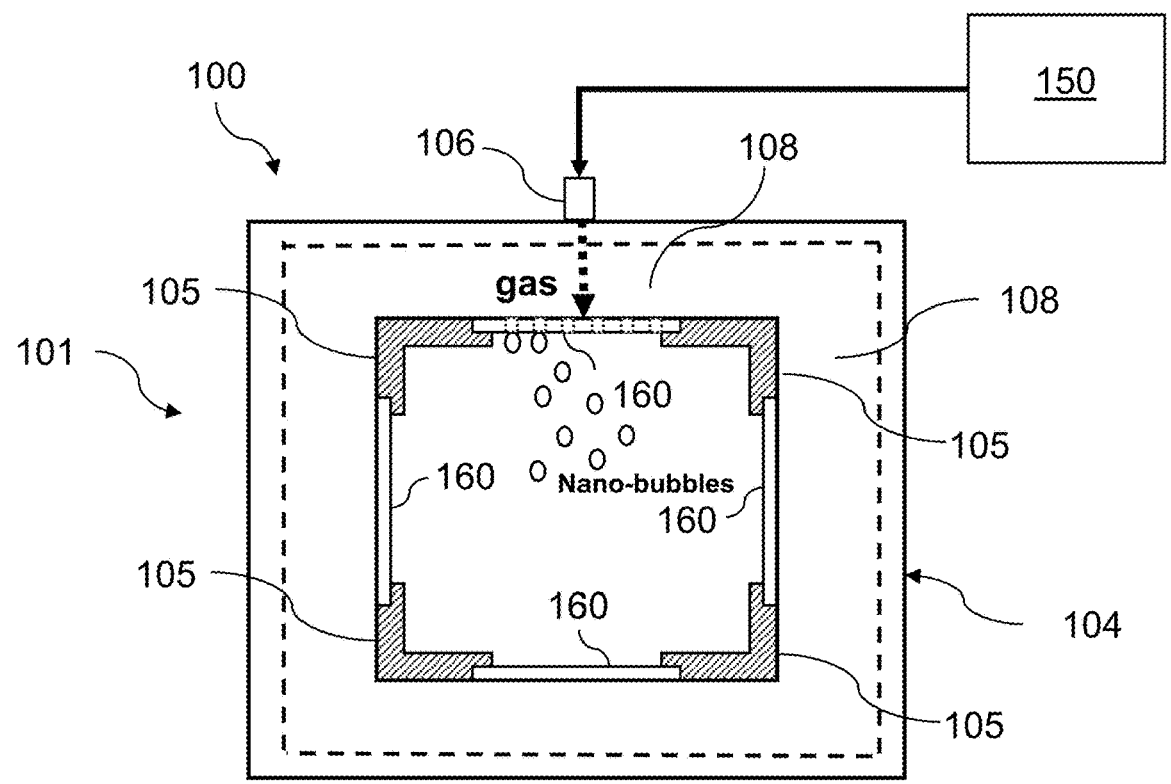
FIG. 1B is a front view of the apparatus of FIG. 1A.

As shown in FIG. 1B, the opening defined by the conduit 101 has a rectangular cross-sectional shape (e.g., square), such that the inner surface 105 of the conduit includes multiple inner walls. The opening defined by the conduit 101 is not necessarily rectangular and can, in some embodiments, have a different shape (for example, circular, oval, pentagonal, hexagonal, or octagonal). In some embodiments, the inner surface 105 of the conduit 101 includes one or more gas diffusers 160a, 160b, 160c (see FIG. 1A), which are similar to or identical to the gas diffuser 160. The one or more gas diffusers 160a, 160b, 160c can be disposed along an entire length or a select portion of the conduit 101. In some embodiments, the conduit itself is made of a gas diffusing material such that the inner surface of the conduit (entirely or partially) serves as a gas diffuser. Some non-limiting examples of materials that can be used to construct the conduit 101 include metal, ceramic, plastic, or composite material.

The first open end 152a of the funnel 151a (see FIG. 1A) is configured to receive a moving liquid carrier (for example, flowing water or a flowing liquid that includes water). The first open end 152a defines a first cross-sectional area. The second open end 152b defines a second cross-sectional area that is smaller than the first cross-sectional area of the first open end 152a. The specific ratio of cross-sectional areas is a function of the minimum target velocity. The second open end 152b is fluidly coupled to the opening defined by the conduit 101. The second open end 152b can be fluidly coupled to the first end 102a.

In some embodiments, the wall 153 of the funnel 151 with respect to the inner, annular surface 105 of the conduit 101 defines an angle that is less than 45 degrees. In some embodiments, the angle ranges from 12 degrees to 22 degrees. The angle is chosen to achieve a sufficient liquid velocity while minimizing friction. Some non-limiting examples of materials that can be used to construct the funnel 151a (or 151b) include metal, ceramic, plastic, or composite material.

The second funnel 151b has a third open end 152c that defines a third cross-sectional area, and a fourth open end 152d that defines a fourth cross-sectional area. The fourth cross-sectional area is smaller than the third cross-sectional area of the third open end 152c. The fourth open end 152d is fluidly coupled to the opening defined by the conduit 101. The fourth open end 152d can be fluidly coupled to the second end of the conduit 102b. In some embodiments, an angle of inclination of the second wall 153b of the second funnel 151b with respect to the inner, annular surface 105 of the conduit 101 is in a range of from 12 degrees to 22 degrees. Some non-limiting examples of materials that can be used to construct the second funnel 151b include metal, ceramic, plastic, or composite material. The second funnel can provide the benefit of adjusting the velocity of the liquid carrier and nano-bubble mixture as it exits the apparatus 100 such that it is approximately equal to the velocity of the surrounding liquid carrier. In some embodiments, the second funnel reduces the velocity such that the liquid carrier flows at laminar flow when exiting the apparatus 100.

The funnel 151a is configured to generate a flow velocity in the liquid carrier received by the opening that is sufficient to create turbulent flow above the turbulent threshold in the absence of external energy that allows the liquid carrier to shear gas from the outer surface of the diffuser, thereby forming nano-bubbles in the liquid carrier. For example, the funnel can be configured to generate flow velocities of at least 2 m/s. In some embodiments, the funnel can be configured to generate flow velocities of at least 4 m/s, at least 6 m/s, or at least 8 m/s. Generating a high flow velocity helps prevent the nano-bubbles from coalescing once formed. Without being bound by theory, it is believed that the velocity of an incompressible liquid increases as the liquid passes through a constriction (known as the "Venturi effect") and that turbulent flow occurs at a high Reynolds number, which is proportional to the liquid's velocity. Accordingly, the decreasing cross-sectional area of the funnel 151a in the direction of liquid flow can facilitate the generation of turbulent flow in the received fluid. Turbulent flow is characterized by a Reynolds number of at least 4,000. Accordingly, the turbulent threshold is the minimum flow velocity for achieving a Reynolds number of at least 4,000. In some embodiments, the apparatus provided herein can achieve a Reynolds number of at least 6,000 or at least 12,000.

The gas diffuser 160 can include multiple pores. The gas diffuser 160 can receive gas (such as air, oxygen, nitrogen, carbon dioxide, or ozone) and generate nano-bubbles from the gas flowing through its pores. Gas is injected into the diffuser at a higher pressure than the liquid carrier. For example, the gas pressure may be at least 1 atm, at least 10 atm, or at least 20 atm. The conduit 101 is configured to direct the liquid (received by the funnel 151a) to a surface of the gas diffuser 160. The turbulent flow of liquid flowing past the surface of the gas diffuser 160 shears (from the surface of the gas diffuser 160) the gas flowing through the pores of the gas diffuser 160, thereby generating nano-bubbles that disperse into and are entrained by the turbulent fluid flow, while minimizing the tendency of initially formed nano-bubbles to coalesce. The gas diffuser 160 is described in more detail later.

In some embodiments, the apparatus 100 is coupled to a gas source 150, such as a compressed gas source, so that gas can be supplied to the gas diffuser 160. In some embodiments, the apparatus 100 includes a pipe fitting or a gas tubing fitting (for example, on an outer surface of the conduit) that can couple to the gas source.

Figure 1C:
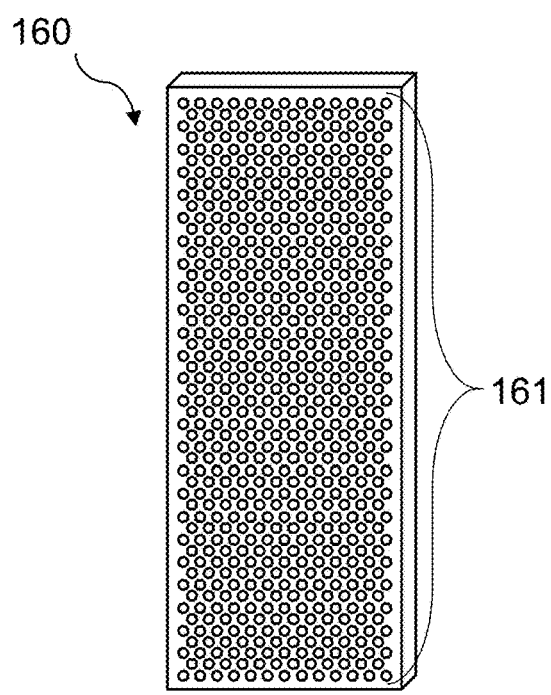
FIG. 1C is a schematic diagram of an exemplary gas diffuser that can be implemented in the apparatuses shown in FIGS. 1A and 1B.

FIG. 1C shows an enlarged view of the gas diffuser 160. The gas diffuser includes multiple pores 161. Gas can be supplied to the gas diffuser 160 and pass through its pores 161. The pores 161 can have a diameter that is less than or equal to 50 µm. In some embodiments, the pores 161 can have a diameter that is in a range of from 200 nm to 50 µm. The pores 161 can be of uniform size or varying size. The pores 161 can be uniformly or randomly distributed across a surface (for example, outer surface) of the gas diffuser 160. The pores 161 can have any regular (for example, circular) or irregular shape.

Although shown in FIG. 1C as being generally rectangular, the gas diffuser 160 can have another shape, such as an elongate member having an oval cross-section. Some non-limiting examples of materials that can be used to construct the gas diffuser 160 include metal, ceramic, plastic, or composite material. During operation of the apparatus (for example, apparatus 100), it is preferred that enough of the gas diffuser 160 is submerged in liquid, so that all of the pores 161 are below the surface of the liquid.

Figure 2:
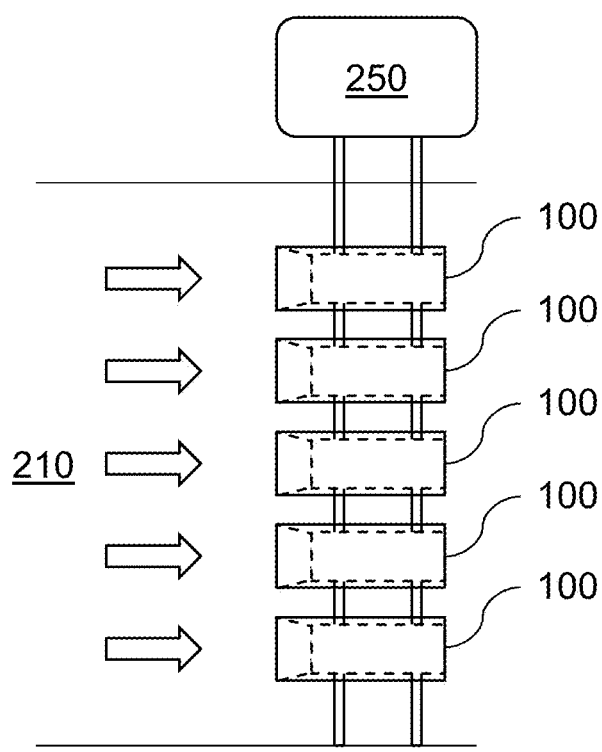
FIG. 2 is a schematic diagram of an exemplary system that can be implemented to infuse gas into liquid.

FIG. 2 is a schematic diagram of an exemplary system that includes the apparatus 100. The system includes the apparatus 100 coupled to a gas source 250. The system can be implemented on a moving liquid carrier 210 (for example, a river). The arrows depict the direction of flow in the moving liquid carrier 210. Although shown in FIG. 2 as including five apparatuses 100a, the system can include fewer (for example, one, two, three, or four) or more (for example, six or more) of the apparatuses 100. Each of the apparatuses 100 are coupled to the gas source 250, such that all of the gas diffusers (not shown) of each of the apparatuses 100 can be supplied with gas from the gas source 250. Each of the apparatuses 100 are optionally anchored in position by transverse bars that extend across the river. Each of the apparatuses 100 can be partially or completely submerged in the moving liquid carrier 210. During operation of the system, it is preferred that, for each of the apparatuses 100, all of the gas diffusers of the respective apparatus 100 are submerged in the moving liquid carrier 210. Although the apparatuses 100 are shown as being aligned with one another in FIG. 2, the configuration of the apparatuses 100 can be different. For example, the system can be implemented with multiple rows, where each row includes one or more apparatuses 100. In some embodiments, different apparatuses (e.g., apparatus 300 shown in FIG. 3) can be used in place of apparatus 100, or in combination with apparatus 100.

The apparatus can be anchored in a partially or fully submersed state within a moving liquid carrier (e.g., body of water). In some embodiments, the apparatus is secured within a tubular body. In some embodiments, the apparatus is anchored to a stationary object. In some embodiments, the apparatus can be attached to a floating device, such as a buoy. In some embodiments, the apparatus anchored to a bottom of the moving liquid carrier, such as a seafloor or bottom of a river. Furthermore, the apparatus can be oriented in a direction that optimizes flow of the moving liquid carrier through the apparatus. For example, the apparatus can be oriented such that its longitudinal axis is generally perpendicular to the direction of flow of the moving liquid carrier.

During use, a moving liquid carrier enters the funnel of the apparatus. The funnel increases the liquid carrier's velocity to create turbulent flow above the turbulent threshold in the absence of an electrical energy source. Contemporaneously, the apparatus' gas inlet receives gas, from the gas source, which is flowed to the interior cavity of the apparatus. The gas enters the pores of the diffuser and flows through the pores to the outer surface of the diffuser. The gas emerging from the pores is sheared from the surface of the diffuser by the moving liquid carrier flowing in the conduit to form nano-bubbles. The mixture of moving liquid and nano-bubbles is then discharged from the apparatus.

The apparatus provided herein can be assembled by installing at least one diffuser (e.g., diffuser 160) to fit within or over an opening along the wall of a conduit (e.g., conduit 101), attaching at least one funnel (e.g., funnel 151a) to the conduit, and housing the funnel, conduit, and diffuser within an outer housing (e.g., outer housing 104) that has a gas inlet. Any of the apparatus described herein and components thereof can be made using various suitable fabrication methods.

Figure 3:
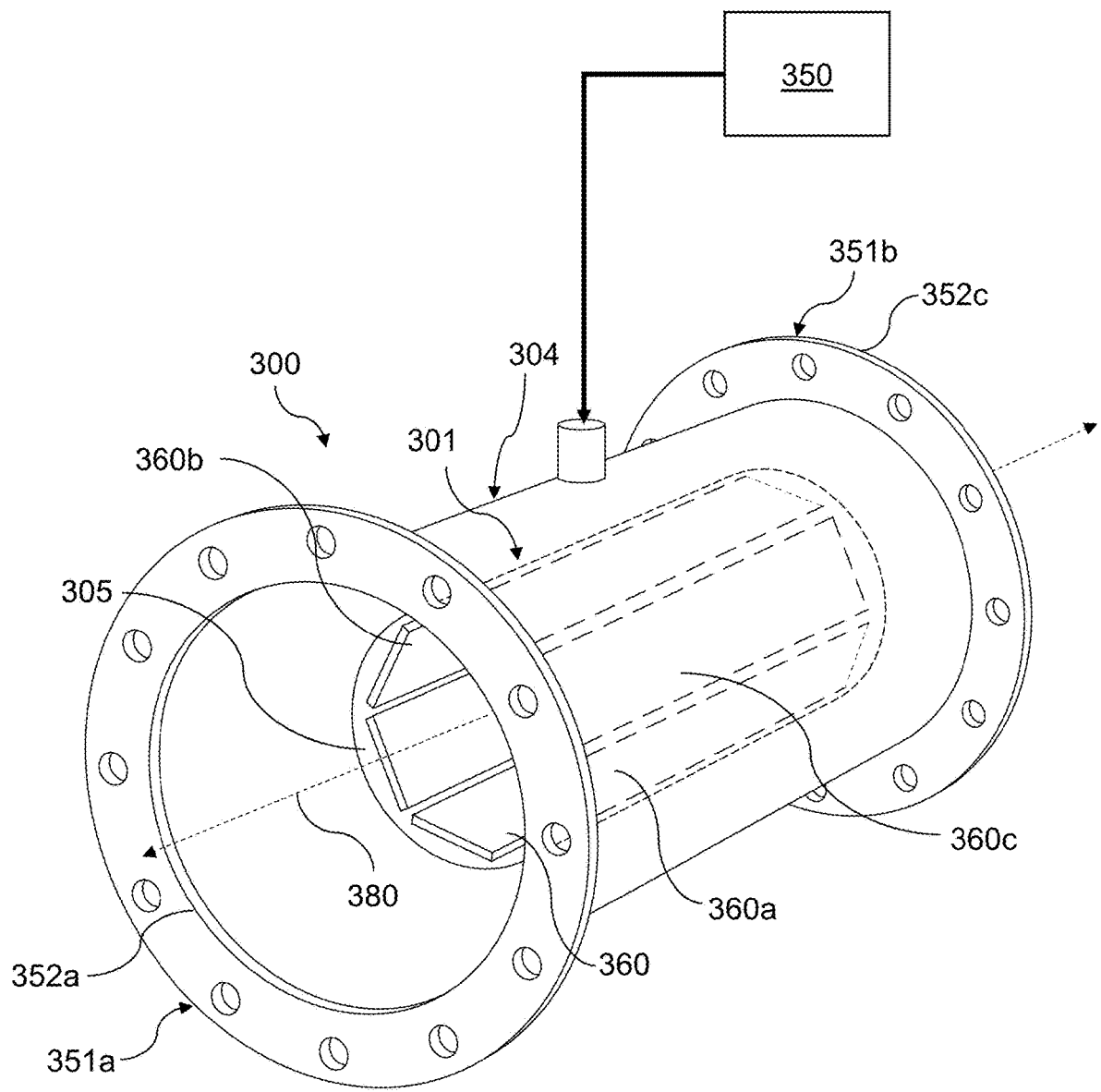
FIG. 3 is a schematic diagram of an exemplary apparatus that can be implemented to infuse gas into liquid.

FIG. 3 is a schematic diagram of another exemplary apparatus 300 that can be implemented to infuse gas from a gas source 350 into liquid, which includes an optional second funnel. The apparatus 300 is substantially similar to the apparatus 100 except that apparatus 300 includes at least one frustoconical funnel 351a (and optionally a second funnel 351b) and features a tubular conduit 301 and a tubular outer housing 304. As shown, the gas diffuser 360 is disposed along an inner wall 305 of the conduit such that gas entering the outer housing 304 can diffuse through conduit wall 305 by passing through the gas diffuser 360. The gas diffuser can include multiple discrete gas diffuser elements 360a, 360b, 360c oriented in a direction parallel to a central axis 380 of the tubular conduit. In some embodiments, the diffuser elements 360a, 360b, 360c can be oriented in a direction perpendicular, or any direction, relative to the central axis of the tubular conduit.

Apparatus 300 operates in a substantially similar manner to that of the previous apparatus 100 shown in FIGS. 1A-C. Apparatus 300's first open end 352a can optionally include a flange, and the third open end 352c can optionally include a flange. The apparatus 300 can be connected to a tubular using these flanged ends.

Any of the apparatuses and methods described herein can include producing a high concentration of nano-bubbles dispersed in the liquid volume exiting the apparatus. In some embodiments, the apparatuses and methods described herein include producing a high concentration of nano-bubbles at the apparatus's outlet that is at least $1 \times 10^6$ nano-bubbles per milliliter (mL), at least $1 \times 10^7$ nano-bubbles/mL, or at least $1 \times 10^8$ nano-bubbles/mL, and compositions in which the liquid carrier contains nano-bubbles that remain stable over a desired time. In some embodiments, the composition exiting the apparatuses described herein contain nano-bubbles that are stable in the liquid carrier for at least one month, and preferably at least 3 months, under ambient pressure and temperature.

Figure 4:
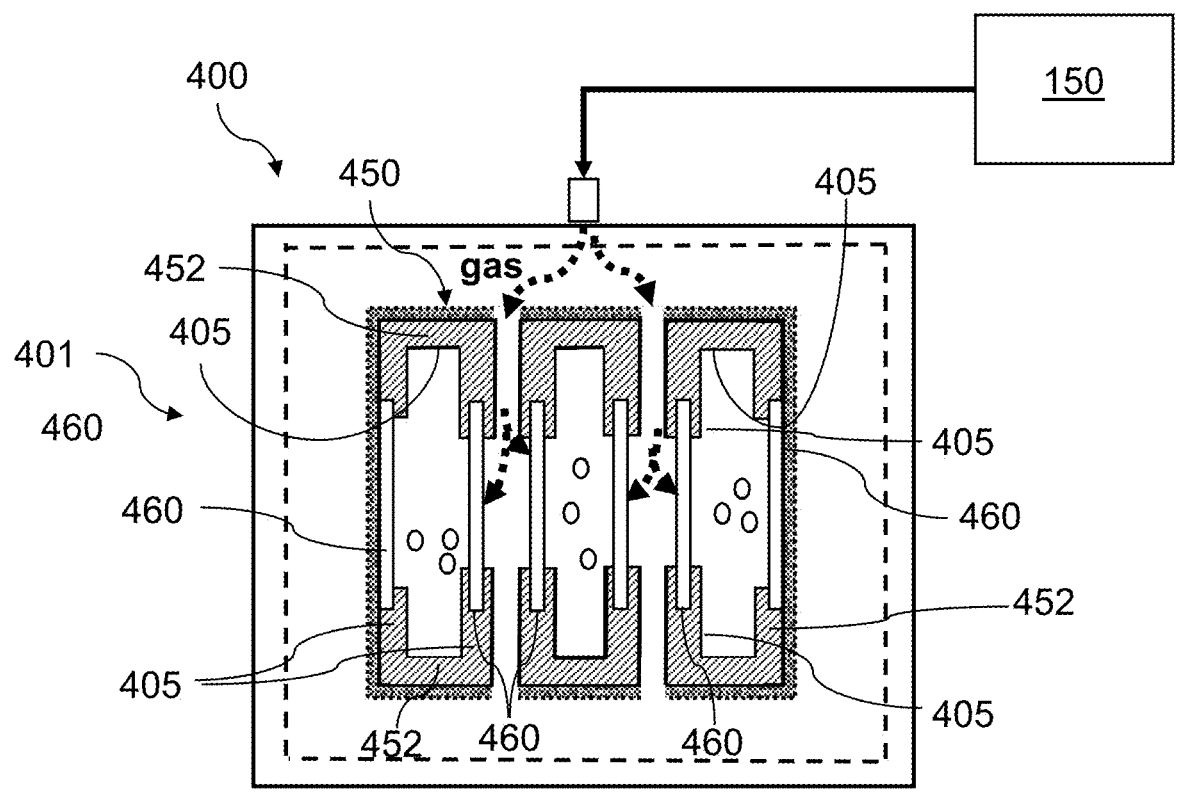
FIG. 4 is a schematic diagram of an exemplary apparatus that includes multiple diffusers and can be implemented to infuse gas into liquid.

Particular embodiments of the subject matter have been described. Other embodiments, alterations, and permutations of the described embodiments are within the scope of the following claims as will be apparent to those skilled in the art. For example, it is possible to include multiple diffusers arranged in parallel with each other and to the flow path in the conduit. The diffusers can be mounted in a frame that, in turn, is mounted to one or more interior walls of the conduit. As shown in FIG. 4, an exemplary apparatus 400 includes a removable frame 450 having multiple vertical walls 452 and multiple diffusers 460 that each fit within or over an opening along a vertical wall 452. The diffusers 460 can be positioned parallel with each other in the conduit 401 and parallel to the flow path of the liquid carrier in some embodiments. Apparatus 400 is similar to apparatus 100, with the exception of having a conduit 401 that includes an insertable frame 450 that forms at least one or more interior surfaces 405 within the conduit 401. The frame 450 can advantageously increase the overall diffuser surface area provided within the conduit 401, which, in turn, can increase nano-bubble production. The frame 450 can also advantageously allow for a quick replacement or exchange of at least a portion of or all of the diffusers 460 within the apparatus 400, which may be needed for diffuser use expiry or during repair.

What is claimed is:

1. An apparatus for producing nano-bubbles in a moving liquid, comprising:
    an elongate conduit having an opening extending axially from a first end to a second end through which the moving liquid can flow, wherein the elongate conduit is elongate in a direction extending from the first end to the second end, the elongate conduit further comprising a gas diffuser disposed on an inner surface of the elongate conduit, the gas diffuser comprising an outer surface configured to contact the moving liquid flowing through the elongate conduit, the gas diffuser comprising a plurality of pores configured to receive a gas from a gas source and transport the gas to the outer surface of the diffuser; and
    a funnel comprising:
        a first open end configured to receive the moving liquid, the first open end defining a first cross-sectional area;
        a second open end opposite the first open end, the second open end defining a second cross-sectional area that is smaller than the first cross-sectional area, the second open end fluidly coupled to the opening of the elongate conduit; and
        a wall extending from the first open end to the second open end, wherein the wall of the funnel with respect to the inner surface of the elongate conduit defines an angle of less than 45 degrees, wherein the funnel, due to the angle of less than 45 degrees, and the elongate conduit, due to the length of the elongate conduit from the first end to the second, are configured to generate a flow velocity in the moving liquid received by the opening sufficient to create turbulent flow above a turbulent threshold in the absence of external energy that allows the moving liquid to shear gas from the plurality of pores at the outer surface of the diffuser, thereby forming nano-bubbles at a concentration of at least $1 \times 10^6$ nano-bubbles per milliliter in the moving liquid.

2. The apparatus of claim 1, wherein the elongate conduit has a generally rectangular cross-sectional shape.

3. The apparatus of claim 1, comprising a plurality of gas diffusers disposed on the inner surface of the elongate conduit.

4. The apparatus of claim 1, wherein the wall of the funnel with respect to the inner surface of the elongate conduit defines an angle that ranges from 12 degrees to 22 degrees.

5. The apparatus of claim 1, wherein the elongate conduit is generally tubular.

6. The apparatus of claim 1, wherein the funnel comprises a flange.

7. The apparatus of claim 1, wherein the wall of the funnel is frustoconical.

8. The apparatus of claim 1, wherein the funnel is a first funnel fluidly coupled to the first end of the elongate conduit, the apparatus further comprising a second funnel fluidly coupled to the second end of the elongate conduit.

9. The apparatus of claim 1, wherein each of the elongate conduit, funnel, and gas diffuser are configured to remain stationary with respect to one another during operation of the apparatus.

10. The apparatus of claim 1, wherein the apparatus comprises multiple diffusers arranged in parallel with each other in the elongate conduit and parallel to the flow path of the moving liquid.

11. A method of generating nano-bubbles in a moving liquid, comprising:
    exposing the apparatus of claim 1 to the moving liquid such that the moving liquid flows into the open end of the funnel and through the elongate conduit from the first end of the elongate conduit to the second end of the elongate conduit; and
    introducing gas from a gas source through the pores of the diffuser to the outer surface of the diffuser, wherein the funnel and elongate conduit generate a flow velocity in the moving liquid sufficient to create turbulent flow above the turbulent threshold in the absence of external energy such that the moving liquid shears the gas from the plurality of pores at the outer surface of the diffuser and forms nano-bubbles at least $1 \times 10^6$ nano-bubbles per milliliter in the moving liquid.

12. The method of claim 11, wherein the moving liquid is a river, a stream, a creek, a brook, a brooklet, a rivulet, a strait, a canal, a channel, a delta, a sea arm, a rill, or a tributary.

* * * * *